Feb. 18, 1969    KARL HEINZ MULLER    3,428,880
MOTOR REVERSING AND SPEED CONTROL APPARATUS
Filed Feb. 20, 1967    Sheet 1 of 2

INVENTOR.
KARL HEINZ MÜLLER
BY
Albin Medved
ATTORNEY

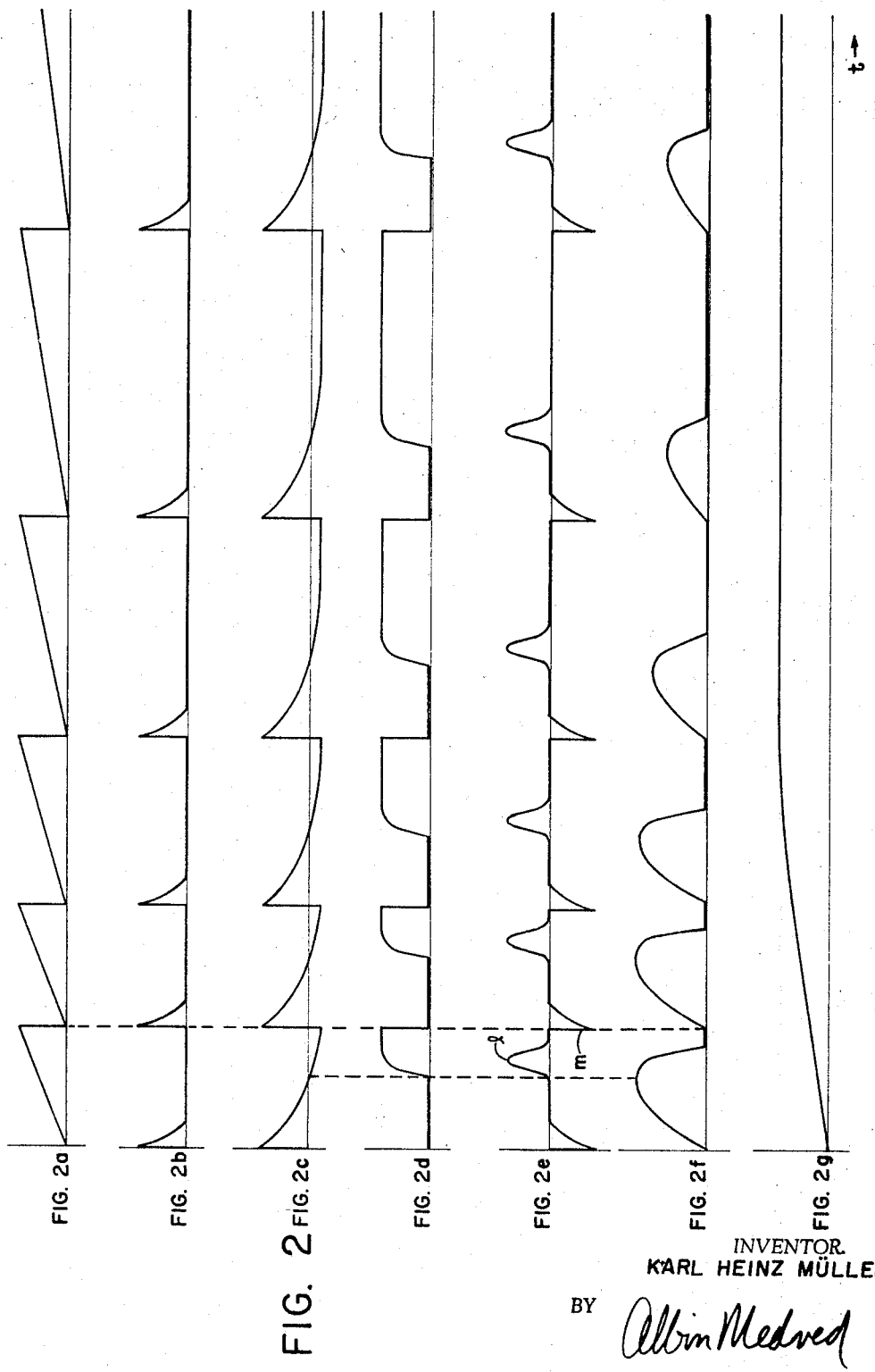

United States Patent Office 3,428,880
Patented Feb. 18, 1969

3,428,880
MOTOR REVERSING AND SPEED CONTROL APPARATUS
Karl Heinz Muller, Neu-Isenburg, Germany, assignor to Honeywell G.m.b.H., Frankfurt am Main, Germany, a corporation of Germany
Filed Feb. 20, 1967, Ser. No. 617,386
Claims priority, application Germany, Feb. 26, 1966, H 58,659
U.S. Cl. 318—257   8 Claims
Int. Cl. H02p 5/16

ABSTRACT OF THE DISCLOSURE

A control circuit for a DC shunt motor incorporating a double bridge controlled rectifier circuit for contact-free regulation of the motor speed and direction.

Brief summary of the invention

Figure 1:
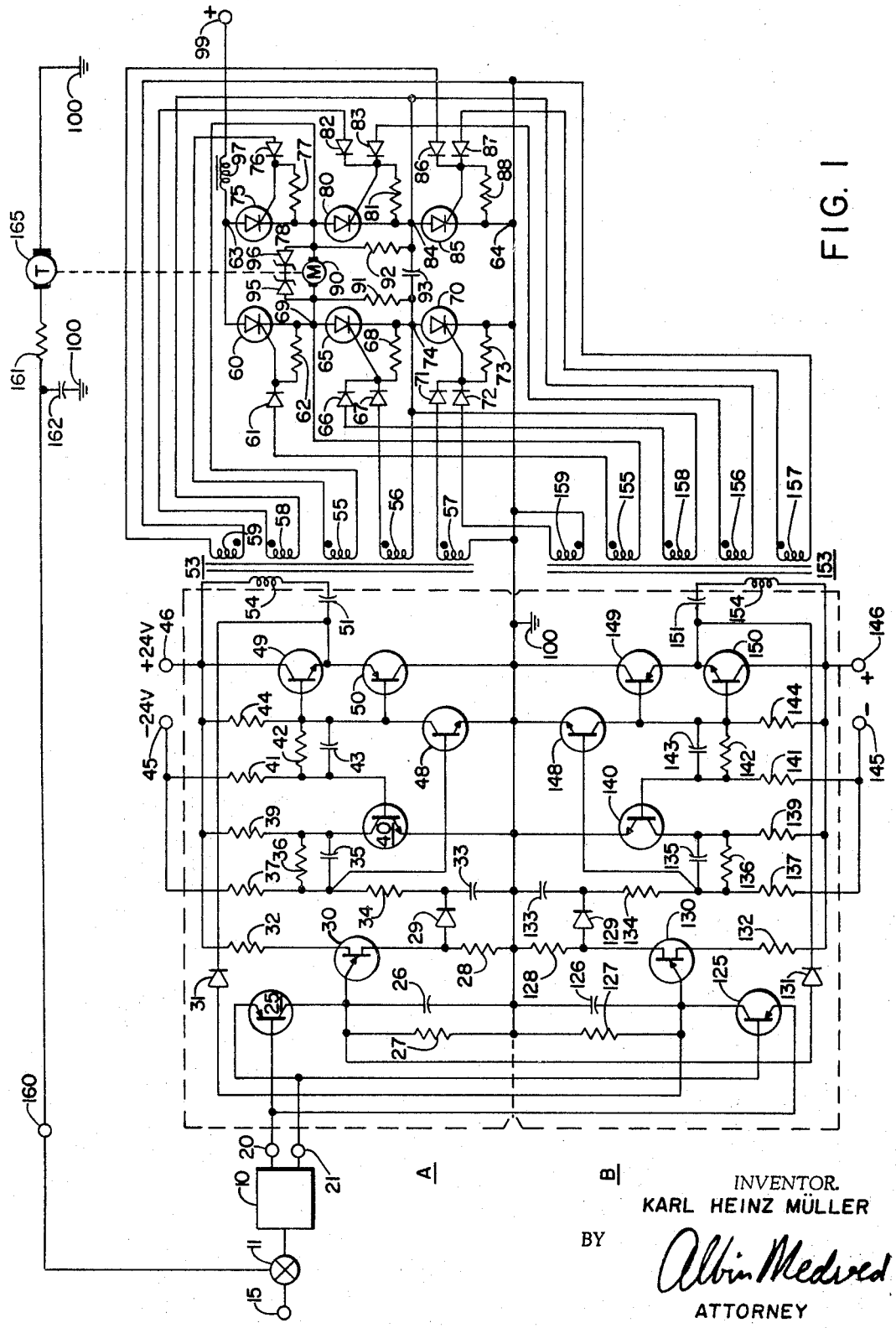

The operation of the motor is controlled through a double bridge circuit comprised of six silicon controlled rectifiers (SCR's) connected to form two parallel paths each comprised of three SCR's connected in series. The ends of the two parallel paths are connected between the opposite polarity terminals of a DC voltage supply source. The motor is connected from junction point between the first and the second SCR of one series to the junction point between the first and the second SCR of the other series in the bridge. A commutating capacitor is connected between the junction points of the second and third SCR's of each series.

Means are provided for switching the bridge SCR's as a function of the shape of the input pulses to control the motor speed and direction. A pair of pulse transformers are provided, one for each direction of motor rotation. Each transformer has at least four secondary windings wound in the same polarity sense. The four secondary windings of one transformer are connected respectively between the gate and the cathode of the first and second SCR's of the first series and the second and third SCR's of the second series, while the four secondary windings of the other transformer are connected respectively between the gate and the cathode electrode of the first and second SCR's of the second series and second and third SCR's of the first series.

In the preferred embodiment of the invention as illustrated in the accompanying drawing, each of the pulse transformers is provided with a fifth secondary winding, connected respectively to the control electrode of the third SCR in each of the two series. During a normal operation of this circuit, a pulse source alternately supplies starting and blocking pulses of opposite polarity to the pulse transformer for the respective duration of rotation. It is well known that once a controlled rectifier is rendered conductive, the gate loses control over its operation and other means must be provided to turn off the rectifier. The controlled rectifier can be turned off only by reducing the current through the rectifier below a certain minimum level. It is therefore, arranged so that the turn-on signal to one rectifier also serves as a turn-off signal to a previously conducting rectifier.

For the turn-on and the turn-off bridge rectifiers, according to the present invention, means are provided for generating rectangular pulses whose width and frequency are a function of motor speed. The rectangular pulses are differentiated to provide pulses of one polarity from the leading edges and the pulses of opposite edges from trailing edges. These pulses are applied through a transformer to the controlled electrodes of the bridge rectifiers to control the current through the motor, thereby controlling the motor speed and direction.

The structure and the operation of the present invention will be more fully understood by those skilled in the art by referring to the following specification, claims, and drawings, in which:

FIGURE 1 illustrates schematically a motor control circuit according to the present invention; and FIGURE 2 illustrates graphically the electrical signals appearing at various points in the circuit during the operation of the control circuit.

Detailed description of the drawings

In FIGURE 1, silicon controlled rectifiers (SCR) 60, 65, 70, 75, 80 and 85 are connected in a bridge configuration. SCR's 60, 65 and 70 are connected in series between junction points 63 and 64. SCR's 75, 80 and 85 are connected in a second series combination also between junction points 63 and 64. A motor 90 is connected at one end to a junction point 69 between SCR's 60 and 65 and is connected at its other end to a junction point 78 between SCR's 75 and 80. Commutating capacitor 93 is connected at one end to a junction point 74 between SCR's 65 and 70 and is connected at its other end to a junction point 84 between SCR's 80 and 85. A resistor 91 is connected between junction points 69 and 74, parallel with SCR 65, and a resistor 92 is connected between junction points 78 and 84 parallel with SCR 80. A pair of Zener diodes 95 and 96 are connected in series with the cathode of one connected to the cathode of the other, and have their anodes connected respectively to the two sides of motor 90 to limit the maximum voltage across the motor. Junction point 63 is connected to a positive potential terminal 99 through a series inductor 97, while junction point 64 is connected to ground potential terminal 100.

Resistors 62, 68, 73, 77, 81 and 88 are connected between the control and the cathode electrodes of SCR's 60, 65, 70, 75, 80 and 85 respectively.

A pair of pulse transformers 53 and 153 are provided. Transformer 53 has a primary winding 54 and secondary windings 55, 56, 57, 58 and 59. Transformer 153 has a primary winding 154 and secondary windings 155, 156, 157, 158 and 159. The secondary windings are connected between the control and the cathode electrodes of the bridge SCR's as follows: winding 55 to SCR 75, winding 155 to SCR 60, windings 56 and 158 to SCR 65, windings 57 and 159 to SCR 70, windings 58 and 156 to SCR 80, and windings 59 and 157 to SCR 85. The sense of the secondary windings of the two transformers is indicated by means of dots. With the exception of windings 59 and 159, all windings have their dotted end connected to the control electrode and the other to the cathode electrode of the respective SCR's. In the case of windings 59 and 159 the polarity is reversed.

Primary winding 54 of transformer 53 is energized from a channel A, while primary winding 154 of transformer 153 is energized from a second channel B. The signal to channels A and B is derived from a combination of a feedback signal from the motor and an independent input signal.

A summing network 11 is provided with first and second inputs and an output. The first input of summing network 11 is connected to an input terminal 15 and the second input is connected to a feedback terminal 160. The feedback from the motor is derived through a tachometer 165. The output of tachometer 165 is a DC voltage signal whose amplitude is proportional to the motor speed and whose polarity is indicative of the motor direction. The voltage signal from tachometer 165 is applied to feedback terminal 160 through a filter network comprised of a series resistor 161 and a capacitor 162 connected between feedback terminal 160 and ground potential terminal 100. The output of summing network 11 is connected to the input of an amplifier 10. Amplifier 10 has first and second output terminals 20 and 21. Output 20 of amplifier 10 is connected directly to a base electrode of a transistor 25 and an emitter electrode of a transistor 125. Output 21 of amplifier 10 is connected to the emitter of transistor 25 and also to the base of transistor 125. The collector electrode of transistor 25 is connected to the emitter electrode of a unijunction transistor 30. A resistor 27 and a capacitor 26 are connected in parallel between the emitter of unijunction transistor 30 and ground potential terminal 100. The first base of unijunction transistor 30 is conncted to ground 100 through a resistor 28 and is further connected directly to the anode of a diode 29. A capacitor 33 is connected between the cathode of diode 29 and ground 100, and a resistor 34 is connected between the cathode of diode 29 and the base electrode of a transistor 48. The second base of unijunction transistor 30 is connected through a resistor 32 to a positive potential terminal 46.

A capacitor 35 and a resistor 36 are connected in parallel between the base of transistor 48 and the collector of a transistor 40. The base of transistor 48 is further connected to a negative potential terminal 45 through a resistor 37. A resistor 39 is connected between the collector of transistor 40 and positive potential terminal 46.

The base of transistor 40 is connected to the collector of transistor 48 through a parallel combination of a resistor 42 and a capacitor 43. The collector of transistor 48 is further connected directly to base electrodes of transistors 49 and 50 and to positive potential terminal 46 through a resistor 44. The emitter of transistor 48 is connected directly to ground 100 and the base of transistor 40 is connected to negative potential terminal 45 through a resistor 41. Transistors 40 and 48 are complementary transistors connected to form a flip-flop circuit.

Transistor 49 is of the NPN type. It has its collector connected directly to a positive potential terminal 46 and has its emitter connected to the emitter of transistor 50, which is of the PNP type. The collector of transistor 50 is connected to ground 100. A capacitor 51 is at one end connected to a junction point between the emitters of transistors 49 and 50 and is at its other end connected to one end of primary winding 54 of pulse transformer 53. The other end of primary winding 54 is connected to positive potential terminal 46.

The above circuit description dealt with channel A. Channel B is identical to channel A. The collector of transistor 125 is connected to the emitter of a unijunction transistor 130. A parallel combination of a capacitor 126 and a resistor 127 is connected between the emitter of unijunction transistor 130 and ground 100. The first base of unijunction transistor 130 is connected to the anode of a diode 129 and also to ground 100 through a resistor 128. The second base of unijunction 130 is connected to a positive potential terminal 146 through a resistor 132. The cathode of diode 129 is connected to one end of a resistor 134 and one end of a capacitor 133. The other end of resistor 134 is connected to the base electrode of a transistor 148, and the other end of capacitor 133 is connected to ground 100. The base electrode of transistor 148 is connected to the collector electrode of a transistor 140 through a parallel combination of a resistor 136 and a capacitor 135. The base of transistor 148 is further connected to a negative potential terminal 145 through a resistor 137. The emitter of transistor 140 is connected directly to ground potential terminal 100 and the collector of transistor 140 is connected to the positive potential terminal 146 through a resistor 139. The base of transistor 140 is connected to the collector of transistor 148 through a parallel combination of a resistor 142 and a capacitor 143, and is further connected to negative potential terminal 145 through a resistor 141. The emitter of transistor 148 is connected directly to ground 100 and its collector is connected directly to the base electrodes of transistors 149 and 150, as well as to the positive potential terminal 146 through a resistor 144.

Transistor 149 is a PNP type and transistor 150 is of an NPN type. Transistor 149 has its collector connected directly to ground terminal 100 and has its emitter connected directly to the emitter of transistor 150. The collector of transistor 150 is connected directly to the positive potential terminal 146. The junction point between the emitters of transistors 149 and 150 is connected to one end of capacitor 151. The other end of capacitor 151 is connected to one end of primary winding 154 of pulse transformer 153, whose other end is connected to positive potential terminal 146. The junction point between the emitters of transistors 149 and 150 is further connected to the emitter of unijunction transistor 130 through a diode 131, the diode being oriented for forward current flow from the emitter of transistor 30 to the junction point between the emitters of transistors 149 and 150. Similarly, the junction point between the emitters of transistors 49 and 50 of channel A is connected to the emitter of unijunction transistor 130 and channel B through a diode 31, diode 31 being connected for forward current flow from the emitter of unijunction transistor 130 to the junction point between the emitters of transistors 49 and 50.

Operation

The circuit of FIGURE 1 at its right extreme shows a double bridge circuit with controlled rectifiers 60, 65, 70, 75, 80 and 85, with motor 90 in the first shunt arm and commutating capacitor 93 in the other. The current to the bridge circuit is supplied from a positive potential terminal 99 through an inductor 97.

The direction of current through the motor determines the direction of the motor rotation, while the magnitude of this current determines its speed. For example, for rotation in a first direction the current should flow through the motor from the right to the left, from junction point 78 to junction point 69. For this to happen it will be necessary to turn on SCR's 75, 65 and 70. Since SCR 75 can be turned on only by an appropriate polarity pulse from pulse transformer 53, through winding 55, the control pulse must be generated by channel A. The speed and the direction of the motor rotation will be determined by the magnitude and the polarity of the input current flowing through the output terminals 20 and 21 of amplifier 10. Assuming that at a particular instant the current is flowing out of terminal 21 and into terminal 20. The current will flow from terminal 21 into the emitter of transistor 25 in channel A and through the base back to terminal 20. The collector current of transistor 25 will flow into capacitor 26, charging capacitor 26 at a rate proportional to the amplitude of the input current from amplifier 10. As the voltage on capacitor 26 reaches a certain value, unijunction transistor 30 is fired, discharging capacitor 26. As capacitor 26 is discharged, unijunction transistor 30 is again turned off and the cycle repeats as long as input current of the particular polarity is present. The voltage at the emitter of unijunction transistor 30 is graphically depicted in FIGURE 2a. The discharging of the current from capacitor 26 through unijunction transistor 30 generates a voltage at the anode of diode 29 as illustrated in FIGURE 2b. This current flows through diode 29 to charge capacitor 33 in the manner shown in FIGURE 2c.

The pulse generated on capacitor 33 controls the monostable flip-flop assembled from complementary transistors 40 and 48. Through this monostable circuit the spikes generated on capacitor 33 are changed into rectangular pulses with constant amplitude and variable width. These pulses are amplified in transistors 49 and 50 producing a signal at the junction point between the emitters of transistors 49 and 50 according to FIGURE 2d. The resulting rectangular pulse is differentiated through capacitor 51 and applied to the primary winding 54 of pulse transformer 53. The signal applied to the primary winding 54 is comprised of positive pulses derived from the leading edges and negative pulses derived from the trailing edges of the rectangular pulses, as illustrated in FIGURE 2e and identified by letters l and m.

FIGURE 2f illustrates the magnitude and the duration of the motor current, and FIGURE 2g illustrates graphically the frequency of the motor rotation.

When a pulse m is applied to primary winding 54 of transformer 53, the secondary windings 55 through 59 generate the pulses with opposite polarity on the dotted ends. The effect of these pulses will be to turn on the respective SCR's to which they are connected, except the pulse on secondary winding 59 which will have no effect due to its reverse connection. The pulse from winding 58 will turn on SCR 80, the pulse from winding 55 will turn on SCR 75, the pulse from winding 56 will turn on SCR 65, and the pulse from winding 57 will turn on SCR 70. In this mode of operation SCR 75, 80, 65 and 70 will be turned on and SCR 60 and 85 will be turned off.

The current from the DC supply source will now flow from positive potential terminal 99, through inductor 97, through SCR 75, through motor 90, through SCR 65, and through SCR 70 to ground potential terminals 100. The current will also flow through SCR 80 into commutating capacitor 93, charging up capacitor 93. As the voltage on capacitor 93 rises, the current through SCR 80 is diminished until it drops to a value sufficiently low to turn SCR 80 off. Resistor 92, which is connected in parallel with SCR 80, supplies a parallel path for the charging current into capacitor 90, accelerating the charging of the capacitor and the turning off of SCR 80. As shown in curve 2f, the motor current increases according to an exponential function.

The turn off is provided by pulse 1 as shown in FIGURE 2e. This pulse acts through the secondary winding 59 to turn on rectifier 85. The pulse will have no effect on any of the other SCR's since the polarities of the other windings are reversed with respect to winding 59. The turning on of SCR 85 results in discharging of capacitor 93 through SCR's 85 and 70. The discharging current through SCR 70 is of opposite polarity to the motor current, temporarily reducing the current through SCR 70 to very low value. The current through SCR 70 drops below the minimum value required to maintain the conduction of SCR 70 turning SCR 70 off. The turning off of SCR 70 interrupts the current flow through SCR 75 and 65, also turning them off and thus turning the current to the motor off. With another pulse m, followed by a pulse l, the above operation is repeated.

Feedback is derived through a tachometer 165 which is coupled to the motor and provides an output DC voltage proportional to the motor speed. This voltage is passed through a filter comprised of resistor 161 and capacitor 162. The DC voltage error signal is applied to one input of summing network 11. In summing network 11 the error voltage is summed with a DC input voltage applied at input 15. The voltage supplied to input terminal 15 may be externally controlled to control the speed and the direction of the motor. This may be accomplished, for example, by means of a potentiometer. The net voltage, appearing in the output of summing network 11, is applied to input of a current amplifier 10 to derive a current at outputs 20 and 21 of amplifier 10 which is proportional to the input voltage.

When it is desired to increase or decrease the motor speed, the current at the output of amplifier 10 will be relatively large. As the motor speed approaches the desired level, however, the current from amplifier 10 will decrease to a level at which it will maintain the motor speed at the desired value. With the smaller current, the time required for charging capacitor 26 sufficiently to fire unijunction transistor 30 will increase. The intervals between the motor current pulses will increase and the amplitude will be decreased, because the increasing of the motor speed raises the bucking potential on the armature.

After the turning off of SCR 70, the stored inductive magnetic energy in the motor will attempt to maintain the flow of current through the motor. This current will charge up capacitor 93 which has previously been discharged through SCR 70 and 85. To prevent excessive charge from building up on capacitor 93 which could possibly cause its destruction by thermo reaction, a pair of Zener diodes 95 and 96 are connected in series and opposite polarity sense across motor 90. These diodes limits the voltage which can be induced across the motor after the disconnection of power supply. By reducing the stored magnetic energy in the armature, an excess flow of electric energy into the commutation capacitor will be prevented. If the current through the motor falls below the value of the holding current to the SCR's, SCR's 75 and 65 will be turned off. The following turn on pulse can, of course, be received in time before SCR's 75 and 65 are turned off.

It may be desired to reduce the speed of the motor by providing electrical breaking, or to reverse the direction of the motor rotation. It will then be necessary to turn on SCR's 60, 80 and 85. An input signal at input 15 which will yield a current of opposite direction at output terminals 20 and 21 of amplifier 10.

Normally, when the motor is rotating in the desired direction, the polarity of the feedback voltage is opposite to the polarity of the input signal at terminal 15. As the speed of the motor approaches closer and closer to the desired value, the amplitude of the feedback voltage increases and the sum of the input and feedback voltages applied to the input of amplifier 10 decreases. When it is desired to brake motor 90 electrically, the input voltage signal at input terminal 15 will be reduced or its polarity reversed. The net result will now be such that the polarity of the input signal to amplifier 10 will be reversed also. The feedback voltage will now add to the input voltage. If formerly the current through motor 90 flowed from the right to the left, it will now flow from the left to the right. The current will now flow from output terminal 20 of amplifier 10 into the emitter of transistor 125 in channel B. The current will be returned through the base of transistor 125 to output terminal 21 of amplifier 10. The collector current of transistor 125 will charge capacitor 126 until the voltage on the capacitor reaches the predetermined value required to fire unijunction transistor 130. The operation of channel B is exactly the same as the operation of channel A which was described previously. The voltage signal generated by unijunction transistor 130 is used to control the flip-flop circuit comprised of transistors 140 and 148. The amplified signals from the flip-flop, appearing at the junction point between the emitters of transistors 149 and 150, is differentiated by capacitor 151 and applied to primary winding 154 of pulse transformer 153. The resulting signal on winding 154 is illustrated in FIGURE 2e, as described with reference to the operation of chanenl A. The signal is transferred to secondary windings 155 through 159. When pulse m appears, SCR's 60, 80, 85 and 65 are turned on through secondary windings 155–158. The signal appearing at winding 159 will not turn on SCR 70 because winding 159 is connected for a reverse polarity. Again, as described with reference to channel A, when the opposite polarity pulse 1 appears on the primary winding of transformer 153, SCR 70 will be turned on through winding 159. The effect of this will be to discharge commutating capacitor 93 and momentarily reduce the current through SCR 85 below the minimum value necessary to maintain its conduction. As the current is reduced, SCR 85 is turned off and the current to the motor is blocked. The remaining SCR's 80 and 60 are thereby also turned off. Upon appearance of the next pulse m, SCR's 60, 65, 80 and 85 will again be turned on and the entire procedure will be repeated.

An inductive coil 97 is connected in series with the bridge between the positive potential terminal 99 and the top of the bridge at junction 63 to protect the circuit from any transients which might be generated by the source.

A further feature of the present invention is the means provided to prevent the generation of a control pulse by one channel until all of the SCR's controlled by the other channel are turned off. To acomplish this, a diode is connected between the pre-stage of one of the channels to the output stage of the other channel with such polarity that when a signal is present at the output stage of the other channel the input of the first channel is cut off or grounded and no pulse can be generated. When the output signal on the other channel disappears, the clamp on the first channel will be released. In FIGURE 1 this is accomplished by diodes 31 and 131.

Diode 31 is connected between the emitter of unijunction 130 at the input stage of channel B and the junction point between the emitters of transistors 49 and 50 at the output stage of channel A. As is evident from FIGURE 2d, the junction point between the emitters of transistors 49 and 50 is grounded during the duration of the pulse. Consequently both sides of capacitor 156 will be grounded during this time, not allowing the buildup of sufficient charge to fire unijunction transistor 130. After the pulse on the output stage of channel A disappears, the clamp across capacitor 126 is removed and normal operation of channel B is allowed. Similarly diode 131 is connected from the output of channel B to the input of channel A to prevent the charging of capacitor 26 when a pulse is present at the output of channel B.

While I have shown a particular embodiment of the present invention, other modifications and improvements will become obvious to those skilled in the art.

1. A control circuit for a DC motor, said circuit comprising:
 first and second terminals for connection to positive and negative terminals of a DC supply source;
 first and second series circuits, each consisting of first, second and third silicon controlled rectifiers, said rectifiers each having an anode, a cathode and a control electrode, in each series the anode of the first rectifier being connected to said first terminal, the cathode of said first rectifier being connected to the anode of said second rectifier, the cathode of said second rectifier being connected to the anode of said third rectifier, and the cathode of said third rectifier being connected to said second terminal;
 a DC motor connected in the shunt arm from a junction point intermediate first and second rectifiers of said first series to a junction point intermediate first and second rectifiers of said second series;
 a commutating capacitor connected in the shunt arm from a junction point intermediate second and third rectifiers of said first series to a junction point intermediate second and third rectifiers of said second series;
 first and second pulse transformers each having a primary winding and at least four secondary windings of same polarity;
 means connecting said four secondary windings of said first transformer respectively to the control electrodes of first and second rectifiers of said first series and second and third rectifiers of said second series and means connecting said four secondary windings of said second transformer respectively to the control electrodes of first and second rectifiers of said second series and second and third rectifiers of said first series, whereby a current is directed in a first direction through said motor upon the presence of appropriate polarity pulse on the primary winding of said first transformer and a current is directed through said motor in the opposite direction upon the presence of appropriate polarity pulse on the primary winding of said second transformer.

2. A control circuit according to claim 1 wherein each of said first and second pulse transformers has a fifth secondary winding connected in reverse polarity with respect to the other four secondary windings, said fifth secondary winding of said first pulse transformer being connected to the control electrode of the third rectifier in said first series and said fifth secondary winding of said second pulse transformer being connected to the control electrode of the third rectifier in said second series.

3. A control circuit according to claim 1 wherein a diode is connected intermediate each winding and respective control electrode, the diodes being oriented for forward current flow towards the control electrodes.

4. A control circuit according to claim 2 wherein a diode is connected intermediate each winding and respective control electrode, the diodes being oriented for forward current flow towards the control electrodes.

5. Apparatus according to claim 1, wherein pulse generating means are provided having a first output connected to the primary winding of said first pulse transformer, a second output connected to the primary winding of said second pulse transformer and having an input;
 said pulse generating means being adapted to provide periodic pulses at its first output when its input is energized with a positive DC signal and to provide periodic pulses at its second output when its input is energized with a negative DC signal.

6. Apparatus according to claim 5 wherein feedback means are provided, said feedback means including:
 means for detecting the speed and direction of the motor rotation and to provide a DC feedback signal whose amplitude is indicative of motor speed and whose polarity is indicative of the direction of motor rotation;
 and summing means having a first input connected to receive said DC feedback signal, a second input for receiving a DC input signal, and an output connected to the input of said pulse generating means.

7. Apparatus according to claim 5, wherein said pulse generating means includes a first channel for energizing said first output when its input signal is positive and a second channel for energizing said second output when the input signal is negative, each said channel having a pulse forming means for forming uniform amplitude-variable width pulses whose width is a function of current amplitude, and differentiating means to form first polarity pulses from the leading edges and opposite polarity pulses from the trailing edges of said variable width pulses.

8. Apparatus according to claim 5 wherein additional means are provided for preventing the occurrence of a pulse at an output of said pulse generating means until all of said controlled rectifiers controlled by the other output are turned off.

References Cited
UNITED STATES PATENTS
3,105,179  9/1963  Young et al. _____ 318—246 XR
3,284,689  11/1966  Rosa _____ 318—345 XR

OTHER REFERENCES
Scalone, J. M.: "Reversible Motor Control," in IBM Technical Disclosure Bulletin, 5(12), p. 54, May 1963.

ORIS L. RADER, *Primary Examiner.*

R. J. HICKEY, *Assistant Examiner.*

U.S. Cl. X.R.
318—293, 341